(12) United States Patent  
Seki

(10) Patent No.: US 8,510,563 B2  
(45) Date of Patent: Aug. 13, 2013

(54) COMMUNICATION APPARATUS

(75) Inventor: Takao Seki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 305 days.

(21) Appl. No.: 12/728,848

(22) Filed: Mar. 22, 2010

(65) Prior Publication Data

US 2010/0306545 A1 Dec. 2, 2010

(30) Foreign Application Priority Data

May 28, 2009 (JP) ................................. 2009-129511

(51) Int. Cl.
*H04L 29/06* (2006.01)

(52) U.S. Cl.
USPC ................................. 713/175; 713/168; 726/6

(58) Field of Classification Search
None
See application file for complete search history.

(56) References Cited

U.S. PATENT DOCUMENTS

| | | | |
|---|---|---|---|
| 2006/0179317 A1* | 8/2006 | Soumiya et al. | 713/176 |
| 2006/0259762 A1* | 11/2006 | Tanimoto | 713/156 |
| 2007/0061583 A1 | 3/2007 | Kanatsu et al. | |
| 2008/0162933 A1* | 7/2008 | Okada | 713/168 |

FOREIGN PATENT DOCUMENTS

| | | |
|---|---|---|
| JP | 2001-352338 A | 12/2001 |
| JP | 2002-190796 A | 7/2002 |
| JP | 2006-60369 A | 3/2006 |
| JP | 2007-81452 A | 3/2007 |

OTHER PUBLICATIONS

Japanese Laid Open Patent Publication No. 2001-352338 A, dated Dec. 21, 2001, together with English-language abstract (corresponding to U.S. Patent Publication No. 2007/0061583 A1 published on Mar. 15, 2007 to Kanatsu et al.)
Japanese Laid Open Patent Publication No. 2007-81452 A, dated Mar. 29, 2007 together with English-language abstract.
Japanese Laid Open Patent Publication No. 2002-190796 A, dated Jul. 5, 2002 together with English-language abstract.
Japanese Laid Open Patent Publication No. 2006-60369 A, dated Mar. 2, 2006, together with English-language abstract.
U.S. Patent Application Publication No. US 2007/0061583 A1 published Mar. 15, 2007 to Kanatsu et al.

* cited by examiner

*Primary Examiner* — Brandon Hoffman
*Assistant Examiner* — Michael D Anderson
(74) *Attorney, Agent, or Firm* — Scully, Scott, Murphy & Presser, P.C.

(57) ABSTRACT

A communication apparatus includes: a first storage unit storing a certification authority certificate; a verification unit verifying an electronic signature attached to a first electronic mail received by a receiving unit from a mail server based on the certification authority certificate; an output unit outputting the first electronic mail when a verification result of the verification unit is positive; a deletion unit deleting the first electronic mail from the mail server; a notification unit notifying a user of information regarding a specific certification authority when a specific certification authority certificate is not stored in the first storage unit; an acquiring unit acquiring the specific certification authority certificate; and a storage control unit storing the acquired specific certification authority certificate. The receiving unit again receives the first electronic mail. The verification unit verifies an electronic signature attached to the again received first electronic mail based on the certification authority certificate.

5 Claims, 7 Drawing Sheets

*FIG. 2*

| ADDRESS TABLE | |
|---|---|
| MAIL ADDRESS (70) | NAME (72) |
| device_a@mail.com | MULTI-FUNCTION DEVICE 40 |
| device_b@mail.com | DEVICE B |
| device_c@mail.com | DEVICE C |
| ⋮ | ⋮ |
| device_z@mail.com | PC50 |

28

82 → device_a@mail.com
84 → device_b@mail.com
86 → device_c@mail.com
88 → device_z@mail.com

FIG. 3

| CERTIFICATE TABLE 30 | | | |
|---|---|---|---|
| TYPE 90 | MAIL ADDRESS/NAME 92 | CERTIFICATE DATA 94 | SECRET KEY DATA 96 |
| CA CERTIFICATE ← 98 | CA1 | AABBCC... | NONE |
| CA CERTIFICATE ← 102 | CA2 | DDEEFF... | NONE |
| SELF DEVICE CERTIFICATE ← 104 | SELF ADDRESS | ABC123... | GHI789... |
| DEVICE CERTIFICATE ← 106 | device_a@mail.com | DEF456... | NONE |
| ⋮ | ⋮ | ⋮ | ⋮ |
| DEVICE CERTIFICATE ← 108 | device_z@mail.com | XXYYZZ... | NONE |

COMMUNICATION APPARATUS

CROSS-REFERENCE TO RELATED APPLICATIONS

This application claims priority from Japanese Patent Application No. 2009-129511 filed on May 28, 2009, the entire subject matter of which is incorporated herein by reference.

TECHNICAL FIELD

The present invention relates to a communication apparatus, and specifically, to a communication apparatus that is connectable to a mail server.

BACKGROUND

With communicating data through the Internet, there is a problem of preventing spoofing of a sender.

There has been proposed a known verification technique using an electronic signature in order to prevent the spoofing of the sender. For example, a known art proposes verification of the electronic signature. The known art verifies the electronic signature, which is included in a device certificate attached to electronic mail, using a certification authority certificate issued by a certification authority for authenticating the device certificate. The known art specifies an act of the spoofing of the sender by determining whether or not the device certificate is issued by the certification authority. Hereinafter, a certification authority certificate, which is issued by a certification authority that authenticates an electronic signature attached to an electronic mail, is referred to as a "specific certification authority certificate".

SUMMARY

Illustrative aspects of an exemplary embodiment of the invention provide an art that provides a user with reliable output results even when a specific certification authority certificate is not stored in a communication apparatus that receives an electronic mail.

BRIEF DESCRIPTION OF THE DRAWINGS

FIG. 2 shows one example of stored contents of an address table;

FIG. 3 shows one example of stored contents of a certificate table;

DETAILED DESCRIPTION

<General Overview>

Figure 1:
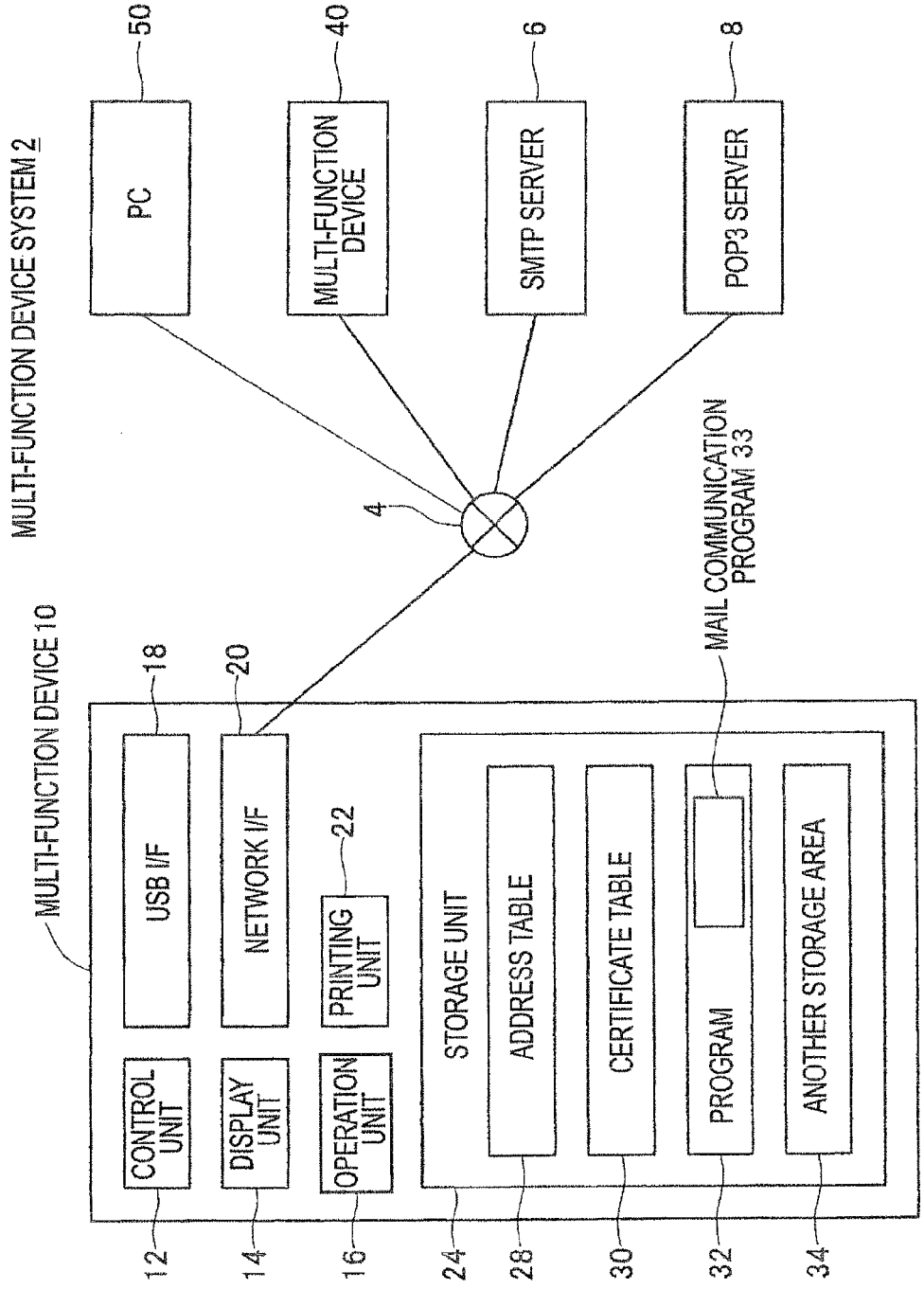
FIG. 1 shows the configuration of a multi-function device system according to an exemplary embodiment of the invention.

In order to verify an electronic signature, it is necessary for a communication apparatus that receives an electronic mail to store a specific certification authority certificate. When the specific certification authority certificate is not stored in the communication apparatus that receives the electronic mail, the electronic signature attached to the received electronic mail is not verified. Thus, the know art may only provide printed matters having low reliability for the user.

The exemplary embodiment of the invention discloses an art that provides a user with reliable output results even when a specific certification authority certificate is not stored in a communication apparatus that receives an electronic mail.

The art according to the exemplary embodiment relates to a communication apparatus connectable to a mail server. The "mail server" refers to a server that executes an electronic mail communication process. The mail server stores an electronic mail. The "communication apparatus" is a concept including all devices that execute the electronic mail communication process. As an example of the communication apparatus, a personal computer (hereinafter, referred to as PC), a server, a printer, a scanner, a copying machine, a facsimile, a multi-function device, and the like may be enumerated. The communication apparatus includes a receiving unit, a first storage unit, a verification unit, an output unit, a deletion unit, a notification unit, an acquiring unit, and a storage control unit. Each unit will be described below in detail.

According to a first illustrative aspect of the invention, a receiving unit is configured to receive electronic mail from the mail server, a first storage unit is configured to store a certification authority certificate, and a verification unit is configured to verify an electronic signature attached to a first electronic mail received by the receiving unit based on the certification authority certificate stored in the first storage unit.

According to the first illustrative aspect of the invention, an output unit is configured to output the first electronic mail when a verification result of the verification unit is positive. Incidentally, "output" includes the printing and displaying of a first electronic mail, and the like. The expression "under condition" does not exclude the addition of other conditions (AND condition and/or OR condition). When the expression "under condition" has been used, other conditions may be added. The same is true when the expression "under condition" is used even in the following.

According to the first illustrative aspect of the invention, a deletion unit is configured to delete the first electronic mail from the mail server when the first electronic mail is configured to be output by the output unit, a notification unit is configured to notify a user of information regarding a specific certification authority when a specific certification authority certificate is not stored in the first storage unit, wherein the specific certification authority certificate is issued by the specific certification authority that authenticates the electronic signature attached to the first electronic mail received by the receiving unit, and an acquiring unit is configured to acquire the specific certification authority certificate in accordance with an operation by the user. Incidentally, a method of acquiring a specific certification authority certificate is not particularly limited. For example, a user may transmit an electronic mail including the specific certification authority certificate to a communication apparatus. In this case, the acquiring unit may acquire the specific certification authority certificate by receiving the electronic mail including the specific certification authority certificate. For example, the user may register the specific certification authority certificate to a predetermined device. In this case, the acquiring unit may acquire the specific certification authority certificate by downloading the specific certification authority certificate from the predetermined device. For example, the user may connect a storage medium, storing the specific certification authority certificate, to the communication apparatus. In this case, the acquiring unit may acquire the specific certification authority certificate by reading the specific certification authority certificate from the storage medium. For example, the user may input an instruction for downloading the specific certification authority certificate from a specific certification authority to the communication apparatus. In this case, the acquiring unit may acquire the specific certification authority certificate by downloading the specific certification authority certificate from the specific certification authority.

According to the first illustrative aspect of the invention, a storage control unit is configured to store the specific certification authority certificate acquired by the acquiring unit in the first storage unit.

According to the first illustrative aspect of the invention, the receiving unit again receives the first electronic mail from the mail server when the mail server stores the first electronic mail, and the verification unit verifies an electronic signature attached to the again received first electronic mail based on the certification authority certificate stored in the first storage unit.

When the specific certification authority certificate is not stored, the communication apparatus is capable of notifying the user of information regarding the specific certification authority. Thereby, the user is capable of knowing that the specific certification authority certificate is not stored in the communication apparatus. The user may perform a predetermined operation for storing the specific certification authority certificate in the communication apparatus (which may be an operation in the communication apparatus or an operation in another device). As a result, the communication apparatus acquires the specific certification authority certificate. Using the specific certification authority certificate, the communication apparatus is capable of verifying an electronic signature attached to a re-received first electronic mail and outputting the first electronic mail successfully verified. Even in the case where the specific certification authority certificate is not stored when the first electronic mail has been received, the communication apparatus is capable of providing the user with the output result of the successfully verified first electronic mail by re-receiving and verifying the first electronic mail thereafter. Further, it is possible to provide reliable output results to the user.

According to a second illustrative aspect of the invention, the communication apparatus further comprises: a second storage unit that is configured to store an electronic mail address corresponding to the user, wherein the notification unit executes the notification by transmitting a second electronic mail including the information regarding the specific certification authority to the electronic mail address corresponding to the user stored in the second storage unit. Incidentally, the communication apparatus may execute a notification process using other methods. For example, the communication apparatus may execute the notification process by displaying information regarding the specific certification authority on the display unit thereof.

According to a third illustrative aspect of the invention, in the communication apparatus, wherein the receiving unit receives a third electronic mail, a transmission source of which is the electronic mail address corresponding to the user, and wherein the acquiring unit acquires the specific certification authority certificate included in the third electronic mail when the specific certification authority certificate is included in the third electronic mail.

According to a fourth illustrative aspect of the invention, in the communication apparatus, wherein when the first electronic mail and the third electronic mail are included in electronic mails received by the receiving unit, the specific certification authority certificate included in the third electronic mail is first stored in the first storage unit before the electronic signature attached to the first electronic mail is verified.

According to a fifth illustrative aspect of the invention, in the communication apparatus, wherein when the specific certification authority certificate is not included in the third electronic mail, the deletion unit deletes the first electronic mail from the mail server.

According to the sixth illustrative aspect of the invention, in the communication apparatus, wherein when the specific certification authority certificate is not included in the third electronic mail and an instruction of deletion of the first electronic mail is included in the third electronic mail, the deletion unit deletes the first electronic mail from the mail server.

According thereto, the first electronic mail can be deleted in response to an instruction from the user.

According to a seventh illustrative aspect of the invention, in the communication apparatus, wherein the notification unit notifies the user of the information regarding the specific certification authority and information regarding the first electronic mail.

For example, "information regarding the first electronic mail" may be the first electronic mail itself, a title of the first electronic mail, text of the first electronic mail, information of a transmission source of the first electronic mail, or other information (for example, a mail ID) capable of specifying the first electronic mail. The above-described communication apparatus can provide the user with information for determining whether or not the communication apparatus is to acquire a specific certification authority certificate as well as the information regarding the specific certification authority.

According to an eighth illustrative aspect of the invention, in the communication apparatus, wherein the receiving unit is configured to periodically check the mail server for the electronic mail destined for the communication apparatus and receive the electronic mail from the mail server in accordance with a checking result of the electronic mail, wherein the receiving unit repeatedly receives the first electronic mail from the mail server unless the deletion unit deletes the first electronic mail, and wherein when the certification authority certificate acquired by the acquiring unit is stored in the first storage unit, the verification unit verifies the electronic signature attached to the again received first electronic mail based on the certification authority certificate stored in the first storage unit.

Incidentally, a control method and a computer program for implementing the above-described communication apparatus are also novel and useful.

<Exemplary Embodiments>

Exemplary embodiments of the invention will now be described with reference to the drawings.

Some parts of the art disclosed in the exemplary embodiments are listed in the following.

(Mode 1) An electronic signature attached to an electronic mail may be included in a device certificate attached to the electronic mail. In this case, the electronic signature may be an electronic signature, in which a certificate digest in which information other than the electronic signature of the device certificate has been digested has been encrypted by a secret key of a certificate authority that authenticates the device certificate. The electronic signature attached to the electronic mail may be an electronic signature, in which a text digest as a text digest of the electronic mail has been encrypted by a secret key of a transmission source of the electronic mail.

(Mode 2) The verification of an electronic signature to be executed using a certification authority certificate may be executed by the steps of:

generating a first certificate digest by decrypting a first electronic signature (a certificate digest encrypted by a secret key of the certification authority) included in the device certificate attached to the electronic mail using a public key of the certification authority included in the certification authority certificate issued by the certification authority which authenticates the device certificate;

generating a second certificate digest by digesting information other than the first electronic signature of the device certificate; and determining whether or not the first certificate digest matches the second certificate digest.

(Mode 3) The communication apparatus may verify the electronic signature without use of a certification authority certificate by the steps of:

generating a first text digest by digesting the text of an electronic mail;

generating a second text digest by decrypting a second electronic signature attached to the electronic mail (a text digest encrypted by a secret key of a transmission source) using a public key of the transmission source included in a device certificate attached to the electronic mail; and determining whether or not the first text digest matches the second text digest.

Mode 4) The communication apparatus may verify the electronic signature without use of a certification authority certificate as follows. That is, the communication apparatus may determine whether or not the current date and time (for example, the receiving date and time of an electronic mail or the execution date and time of verification processing) is included in the term of validity of a device certificate attached to the electronic mail.

(System Configuration)

FIG. 1 is a schematic diagram of a multi-function device system 2 according to the exemplary embodiment. The multi-function device system 2 includes the Internet 4, a plurality of multi-function devices 10 and 40, a PC 50, an SMTP server 6 and a POP3 server 8. Each of the SMTP server 6, the POP3 server 8, the multi-function devices 10, 40 and the PC 50 is connected to the Internet 4. Incidentally, although FIG. 1 shows only two multi-function devices 10, 40 and one PC 50, the number of multi-function devices and/or the number of PCs can be changed appropriately.

(Encryption Technique by S/MIME)

The multi-function device 10 is a communication apparatus capable of communicating electronic mail using an encryption technique by S/MIME (Secure/Multipurpose Internet Mail Extensions). The multi-function device 40 has a configuration similar to that of the multi-function device 10.

A mechanism at the time when the multi-function device 10 receives electronic mail from the multi-function device 40 using the encryption technique by the S/MIME will hereinafter be described. First, a mechanism at the time when the multi-function device 40 sends electronic mail to the multi-function device 10 will be described. The multi-function device 40 encrypts an electronic mail text using a common key and generates the encrypted electronic mail text. Further, the multi-function device 40 creates a digest of the electronic mail text from the electronic mail text using a hash function, and attaches a signature (hereinafter called an encrypted text digest (that is, a second electronic signature)) obtained by encrypting the digest using a secret key of the multi-function device 40 to the electronic mail. Further, the multi-function device 40 attaches its own device certificate (a device certificate of the multi-function device 40) to the electronic mail. That is, the encrypted text digest and the device certificate of the multi-function device 40 are attached to the electronic mail. The multi-function device 40 sends the electronic mail to the multi-function device 10. Incidentally, the device certificate of the multi-function device 40 includes a public key of the multi-function device 40, an electronic mail address of the multi-function device 40, information about a certification authority which is an issue source of the device certificate of the multi-function device 40, a first electronic signature (that is, a signature (hereinafter called an encrypted certificate digest) obtained by encrypting digest data in which information other than the first electronic signature of the device certificate is digested by a secret key of the certification authority) generated by the certification authority, and information about the expiration date of the device certificate, etc. The multi-function device 40 encrypts the common key by a public key of the multi-function device 10 and sends the encrypted common key to the multi-function device 10. The public key of the multi-function device 10 is included in a device certificate of the multi-function device 10. It is necessary for the multi-function device 40 to previously acquire the device certificate of the multi-function device 10.

Next, a mechanism at the time when the multi-function device 10 receives electronic mail from the multi-function device 40 will be described. The multi-function device 10 decodes an encrypted common key by a self-secret key and acquires the common key. Further, the multi-function device 10 decodes an encrypted electronic mail text using the acquired common key and acquires the electronic mail text. Since the electronic mail text sent from the multi-function device 40 to the multi-function device 10 is encrypted, a third party can be prevented from sneaking a look at the electronic mail text. Also, the multi-function device 10 generates first digest data by decoding an encrypted text digest attached to the electronic mail using the public key of the multi-function device 40. The public key of the multi-function device 40 is included in the device certificate of the multi-function device 40. It is necessary for the multi-function device 10 to previously acquire the device certificate of the multi-function device 40. Further, the multi-function device 10 generates second digest data by digesting the electronic mail text by the self. The multi-function device 10 can specify an act of falsifying the electronic mail text by determining whether or not the first digest data matches with the second digest data. Incidentally, the encrypted common key sent from the multi-function device 40 to the multi-function device 10 may be sent in a state of being attached to the electronic mail together with the encrypted electronic mail text or may be previously sent by communication processing different from the electronic mail.

Further, the multi-function device 10 determines whether or not a certification authority certificate (hereinafter called a target certification authority certificate) issued by the certification authority for authenticating the device certificate of the multi-function device 40 attached to the electronic mail is stored. When the target certification authority certificate is stored in the multi-function device 10, the multi-function device 10 generates first digest data by decoding an encrypted certificate digest included in the device certificate of the multi-function device 40 attached to the electronic mail using a public key of the certification authority included in the target certification authority certificate. Further, the multi-function device 10 generates second digest data by digesting information other than the encrypted certificate digest in the device certificate of the multi-function device 40 attached to the electronic mail. The multi-function device 10 determines whether or not the first digest data matches with the second digest data and an electronic mail address of the multi-function device 40 included in the device certificate of the multi-function device 40 attached to the electronic mail matches with an electronic mail address of a sending source of the electronic mail. Consequently, an act of spoofing can be specified.

(Configuration of Multi-Function Device)

Subsequently, a configuration of the multi-function device 10 will be described.

The multi-function device 40 has a configuration similar to that of the multi-function device 10. The multi-function device 10 includes a control unit 12, a display unit 14, an operation unit 16, a USB interface 18, a network interface 20, a printing unit 22, a storage unit 24, etc. The control unit 12 executes processing according to a program 32 stored in the storage unit 24. The display unit 14 displays various pieces of information. The operation unit 16 includes plural keys. A user can input various instructions to the multi-function device 10 by operating the operation unit 16. USB memory (not shown) etc. are connected to the USB interface 18. The network interface 20 is connected to the Internet 4. The printing unit 22 prints image data.

A storage unit 24 can store an address table 28 and a certificate table 30. The storage unit 24 further stores a program 32 to be executed by a control unit 12. The program 32 includes a mail communication program 33. The mail communication program 33 is used when an electronic mail is received from the POP3 server 8 and when an electronic mail is transmitted to the SMTP server 6. The storage unit 24 has a storage area 34 for storing information other than the above-described information 28, 30, and 32.

(Stored Contents of Address Table)

Subsequently, stored contents of the address table 28 (see FIG. 1) of the storage unit 24 will be described. FIG. 2 shows one example of the stored contents of the address table 28. The address table 28 includes a plurality of pieces of combination information 82 to 88. Each piece of the combination information 82 to 88 is information in which a mail address 70 has been associated with a name 72. The mail address 70 is a mail address registered to the multi-function device 10. In the exemplary embodiment, a plurality of mail addresses is registered to the address table 28. In the example of FIG. 2, four types of mail addresses are shown. The name 72 is a device name corresponding to each mail address. In the exemplary embodiment, the combination information 82 is information regarding the multi-function device 40, and the combination information 88 is information regarding the PC 50.

(Stored Contents of Certificate Table)

Subsequently, stored contents of the certificate table 30 of the storage unit 24 (see FIG. 1) will be described. FIG. 3 shows one example of the stored contents of the certificate table 30. The certificate table 30 includes a plurality of pieces of combination information 98 to 108. Each piece of the combination information 98 to 108 is information in which a type 90, a mail address/name 92, certificate data 94, and secret key data 96 are associated. The type 90 is a type of certificate. A "CA certificate" is a CA certificate issued by a certification authority (CA). "Its own device certificate" is a device certificate of the multi-function device 10 acquired from the certification authority. A "device certificate" is a device certificate of another communication apparatus (for example, the multi-function device 40, the PC 50, or the like). The mail address/name 92 is a mail address or a certificate name corresponding to each certificate. For example, when the certificate type is the "CA certificate", a CA name is stored. When the certificate type is "its own device certificate", a mail address of the multi-function device 10 is stored. When the certificate type is the "device certificate", a mail address of another communication apparatus is stored. For example, the mail address/name 92 of the combination information 106 is the same as the mail address of the combination information 82 of FIG. 2. As described above, the combination information 82 is information regarding the multi-function device 40. Accordingly, the combination information 106 is information regarding the multi-function device 40. Likewise, the combination information 108 is information regarding the PC 50. The certificate data 94 is a total of data of various certificates. The secret key data 96 is a secret key of the multi-function device 10. Accordingly, the secret key data 96 is not stored in the combination information 98, 102, 106, and 108 other than "its own device certificate".

The multi-function device 10 can previously acquire a self-device certificate. For example, when the multi-function device 10 sends a request to a predetermined certification authority, the predetermined certification authority creates a device certificate in response to the request and sends the device certificate to the multi-function device 10. Consequently, the multi-function device 10 can acquire the device certificate. Alternatively, for example, a user can make the certification authority create the device certificate of the multi-function device 10 using an external device (for example, a PC) other than the multi-function device 10. The user stores the device certificate of the multi-function device 10 acquired in the external device in USB memory. The user inserts the USB memory into the USB interface 18 (see FIG. 1). Consequently, the multi-function device 10 can acquire the device certificate.

In the address table 28 shown in FIG. 2, the mail address of the combination information 88 (that is, the mail address of the PC 50) is a mail address of a manager. A predetermined flag (not shown) which is not associated with the other combination information 82 to 86 is associated with the combination information 88 as the user presets the mail address of the PC 50 as the mail address of the manager. The multi-function device 10 can specify the mail address of the manager by specifying the combination information 88 associated with the above-described predetermined flag in the address table 28.

(Process Executed by Multi-Function Device)

Figure 4:
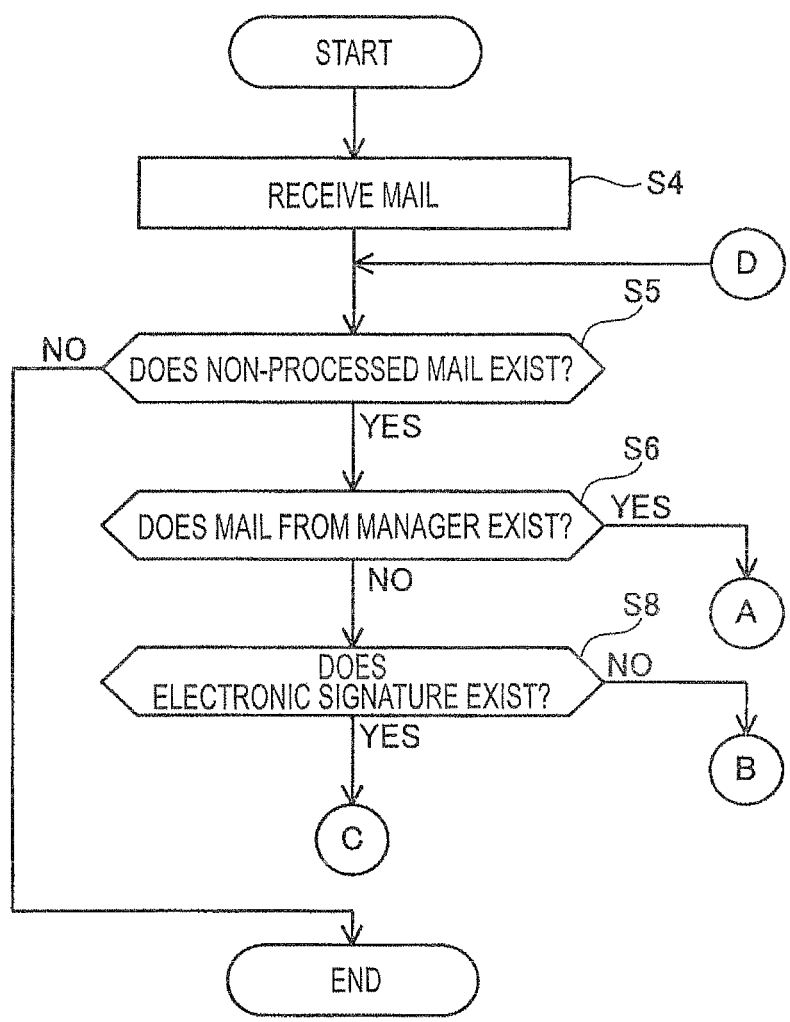
FIG. 4 shows a flowchart of a process executed by the multi-function device.

Subsequently, a process to be executed by the control unit 12 of the multi-function device 10 will be described. FIG. 4 shows a flowchart of a process to be executed by the control unit 12 (see FIG. 1) according to the mail communication program 33 (see FIG. 1) of the storage unit 24 (see FIG. 1). This process is started at every predetermined timing. The control unit 12 accesses the POP3 server 8 at every predetermined timing described above, and checks whether or not an electronic mail destined for the multi-function device 10 exists. When the electronic mail destined for the multi-function device 10 exists, the control unit 12 receives the electronic mail (S4). The received electronic mail is temporarily stored in the multi-function device 10. Next, the control unit 12 determines whether or not there is an electronic mail for which the process of S6 and subsequent steps has not been executed in the multi-function device 10, that is, whether or not there is a non-processed electronic mail, among electronic mails received in step S4 (S5). When the transition from S4 to S5 has been taken, the control unit 12 constantly proceeds to S6. The control unit 12 executes the process of S6 and subsequent steps for the non-processed electronic mail. On the other hand, when the process of S6 and subsequent steps (that is, a process of verifying the received electronic mails, a process of outputting the electronic mails, or the like) for all received electronic mails has been completed, the control unit 12 determines that the determination result is NO in S5 and ends the process. The control unit 12 determines whether or not there is an electronic mail having a mail address of a transmission source of the received electronic mail which matches the mail address of the manager (the mail address of the combination information 88 of FIG. 2) stored in the address table 28 (S6). If YES in step S6, the control unit 12 determines that the received electronic mail is an electronic mail (hereinafter, referred to as "third electronic mail") from the manager, and executes the process of S22 of FIG. 6 and subsequent steps. On the other hand, if NO in step S6, the control unit 12 determines that the received electronic mail is not the electronic mail from the manager, and an electronic signature (a first electronic signature (that is, an encrypted certificate digest included in a device certificate)) and a second electronic signature (that is, an encrypted text digest) are attached (S8). If YES in S8, the control unit 12 executes the process of S10 of FIG. 5 and subsequent steps. On the other hand, if NO in S8, the control unit 12 executes the process of S16 of FIG. 5 and subsequent steps.

Figure 5:
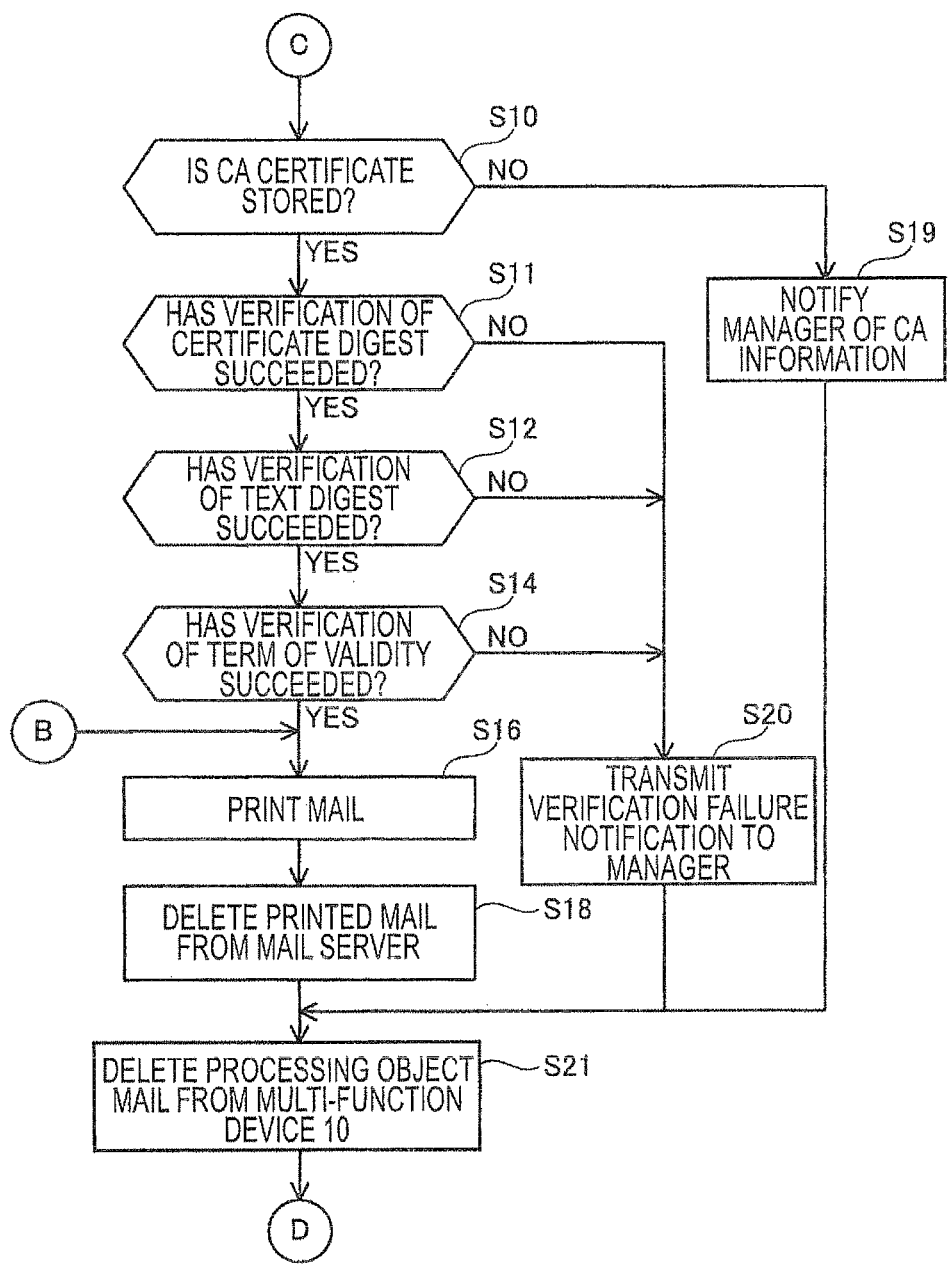
FIG. 5 shows another flowchart continued from FIG. 4.

FIG. 5 shows a continuation flowchart of FIG. 4. In S10, the control unit 12 determines whether or not a CA certificate (hereinafter, referred to as "specific CA certificate") issued by a CA (hereinafter, referred to as "specific CA") which authenticates a device certificate attached to an electronic mail (hereinafter, referred to as "first electronic mail") having an attached electronic signature is stored in the certificate table 30. The device certificate attached to the first electronic mail includes a name of the specific CA. The control unit 12 specifies the specific CA name from the device certificate attached to the first electronic mail. The certificate data 94 (the certificate data 94 of the combination information 98 and 102) of the CA certificates stored in the certificate table 30 (see FIG. 3) includes a CA name of a certificate of an issuance source of the CA certificate. The control unit 12 makes the determination of S10 by determining whether or not the above-described specific CA name is included in the certificate data 94 of the combination information 98 and 102.

If NO in S10, the control unit 12 transmits an electronic mail (hereinafter, referred to as "second electronic mail") including CA information to the electronic address of the manager (S19). The above-described CA information includes a name of a specific CA, a mail address of a transmission source of the first electronic mail, a title of the first electronic mail, and text of the first electronic mail. When the notification of S19 is executed, the control unit 12 moves to S21, and deletes the first electronic mail temporarily stored in the multi-function device 10 from the storage area of the multi-function device 10. The control unit 12 returns to the determination process of S5.

On the other hand, if YES in S10, the control unit 12 verifies the CA certificate (S11). The verification of the CA certificate will be described below in detail.

(Verification of CA Certificate)

The control unit 12 creates a first certificate digest by digesting information other than a certificate digest encrypted in the device certificate attached to the first electronic mail. The control unit 12 decrypts the encrypted certificate digest included in the device certificate attached to the first electronic mail using a public key of a certification authority included in a specific CA certificate to create a second certificate digest. The control unit 12 determines whether or not the first certificate digest matches the second certificate digest. The multi-function device 10 determines whether or not the mail address of the transmission source of the first electronic mail matches a mail address included in the device certificate attached to the first electronic mail. When the first certificate digest and the second certificate digest are identical and when the mail address of the transmission source of the first electronic mail and the mail address included in the device certificate attached to the first electronic mail are identical, the control unit 12 determines that the verification has succeeded (S11: YES), and proceeds to S12. In contrast, when the first certificate digest and the second certificate digest are different or when the mail address of the transmission source of the first electronic mail and the mail address included in the device certificate attached to the first electronic mail are different, the control unit 12 determines that the verification has failed (S11: NO), and proceeds to S20. In S20 to be executed when the determination result is NO in S11, the control unit 12 transmits an electronic mail including information indicating that the verification of the CA certificate has failed to the mail address of the manager. The electronic mail further includes the mail address of the transmission source of the first electronic mail, the title of the first electronic mail, and the text of the first electronic mail. When the notification of S20 is executed, the control unit 12 moves to S21, and deletes the first electronic mail temporarily stored in the multi-function device 10 from the storage area of the multi-function device 10. The control unit 12 returns to the determination process of S5.

In S12, the control unit 12 verifies the encrypted text digest. The verification of the encrypted text digest will be described below.

(Verification of Encrypted Text Digest)

The control unit 12 generates a first text digest by digesting the text of the first electronic mail using a Hash function. The control unit 12 decrypts the encrypted text digest attached to the first electronic mail using a public key included in the device certificate attached to the first electronic mail (or the device certificate stored in the certificate table 30 in correspondence with the mail address of the transmission source of the first electronic mail), and generates a second text digest. Next, the control unit 12 determines whether or not the first text digest matches the second text digest. When the first text digest and the second text digest are identical, the control unit 12 determines that the verification has succeeded (S12: YES), and proceeds to S14. When the first text digest and the second text digest are different, the control unit 12 determines that the verification has failed (S12: NO), and proceeds to S20. In S20 to be executed when the determination result is NO in S12, the control unit 12 transmits an electronic mail including information indicating that the verification of the encrypted text digest has failed to the mail address of the manager. This electronic mail further includes the mail address of the transmission source of the first electronic mail, the title of the first electronic mail, and the text of the first electronic mail.

In S14, the control unit 12 verifies the term of validity of the device certificate. The verification of the term of validity of the device certificate will be described below in detail.

(Verification of Term of Validity of Device Certificate)

The first electronic mail includes the date and time when the first electronic mail has been received by the POP3 server 8. The control unit 12 specifies the date and time from the first electronic mail. The control unit 12 determines whether or not the above-described specified date and time is included between the beginning period and the ending period of the term of validity of the device certificate attached to the first electronic mail. If the specified date and time is included between the beginning period and the ending period of the term of validity of the device certificate attached to the first electronic mail, the control unit 12 determines that the verification has succeeded (S14: YES), and proceeds to S16. In contrast, if the specified date and time is not included between the beginning period and the ending period of the term of validity of the device certificate attached to the first electronic mail, the control unit 12 determines that the verification has failed (S14: NO), and proceeds to S20. In S20 to be executed when the determination result is NO in S14, the control unit 12 transmits an electronic mail including information indicating that the verification of the term of validity of the device certificate has failed to the mail address of the manager. This electronic mail further includes the mail address of the transmission source of the first electronic mail, the title of the first electronic mail, and the text of the first electronic mail.

In S16, the control unit 12 prints the first electronic mail. Next, the control unit 12 transmits a command for deleting the printed first electronic mail from the POP3 server 8 to the POP3 server 8 (S18). Upon receipt of the above-described command, the POP3 server 8 deletes the first electronic mail stored in the POP3 server 8. When S18 is executed, the control unit 12 moves to S21, and deletes the first electronic mail temporarily stored in the multi-function device 10 from the storage area of the multi-function device 10. The control unit 12 returns to the determination process of S5. When a process of executing S19 and 520 is completed, the control unit 12 does not transmit a command for deleting the first electronic mail to the POP3 server 8. As a result, the POP3 server 8 continuously stores the first electronic mail without deleting the first electronic mail.

Figure 6:
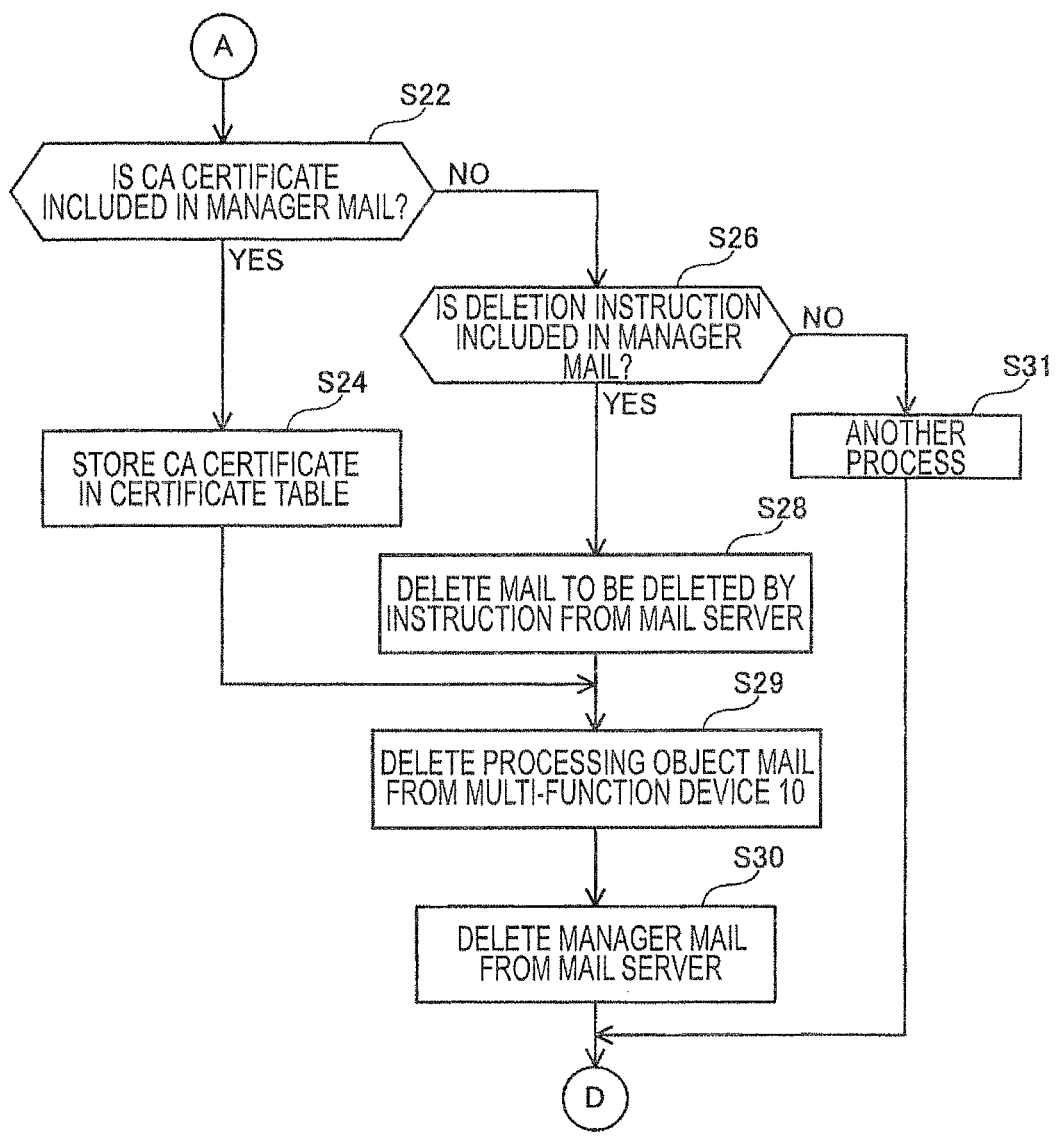
FIG. 6 shows still another flowchart continued from FIG. 4.

FIG. 6 shows a continuation flowchart of FIG. 4. In S22, the control unit 12 determines whether or not a specific CA certificate (that is, a CA certificate issued by a specific CA which authenticates the device certificate attached to the first electronic mail) is included in a third electronic mail. As described above, the manager (that is, the user of the PC 50) can know that the specific CA certificate is not stored in the multi-function device 10 by executing the process of S19 of FIG. 5. The manager can download the above-described specific CA certificate by operating the PC 50, and transmit the third electronic mail including the above-described specific CA certificate to the mail address of the multi-function device 10. In this case, the determination result is YES in S22 of FIG. 6. If YES in S22, the control unit 12 stores the specific CA certificate in the certificate table 30 (see FIG. 3) (S24) and moves to S29. In S29, the control unit 12 deletes an electronic mail of a processing object temporarily stored in the multi-function device 10, that is, the third electronic mail (manager mail) from the multi-function device 10. Next, the process of S30 is executed.

If NO in S22, the control unit 12 determines whether or not a deletion instruction indicating that the first electronic mail is to be deleted is included in the third electronic mail (S26). As the process of S19 or S20 of FIG. 5 is executed as described above, the manager (that is, the user of the PC 50) can know the mail address of the transmission source of the first electronic mail, the title of the first electronic mail, and the text of the first electronic mail. The manager can determine that the first electronic mail is not necessary to be printed by viewing information thereof. In this case, the manager can transmit the third electronic mail including the deletion instruction indicating that the first electronic mail is to be deleted by operating the PC 50 to the multi-function device 10. In this case, the determination result is YES in S26 of FIG. 6. The above-described deletion instruction includes a mail ID of the first electronic mail to be deleted. If YES in S26, the control unit 12 transmits a command for deleting an electronic mail corresponding to the mail ID included in the deletion instruction (that is, a command for deleting the first electronic mail) to the POP3 server 8 (S28). Upon receipt of the above-described command, the POP3 server 8 deletes the first electronic mail corresponding to the mail ID indicated by the above-described command. When S28 is ended, the process proceeds to S29. In S29, the electronic mail of the processing object, that is, the third electronic mail (manager mail) is deleted from the multi-function device 10. Next, the process moves to S30. If NO in S26, the electronic mail is determined to be sent from the manager but not to include the deletion instruction indicating that the first electronic mail is to be deleted, and another process (for example, the same process as a process for the electronic mail when the determination result is NO in S6) is executed.

In S30, the control unit 12 provides the POP3 server 8 with a command for deleting the third electronic mail from the POP3 server 8. The command includes the mail ID of the third electronic mail. Upon receipt of the above-described command, the POP3 server 8 deletes the third electronic mail corresponding to the mail ID indicated by the above-described command. When S30 is ended, the multi-function device 10 returns to the determination process of S35.

(Process Executed by PC)

Figure 7:
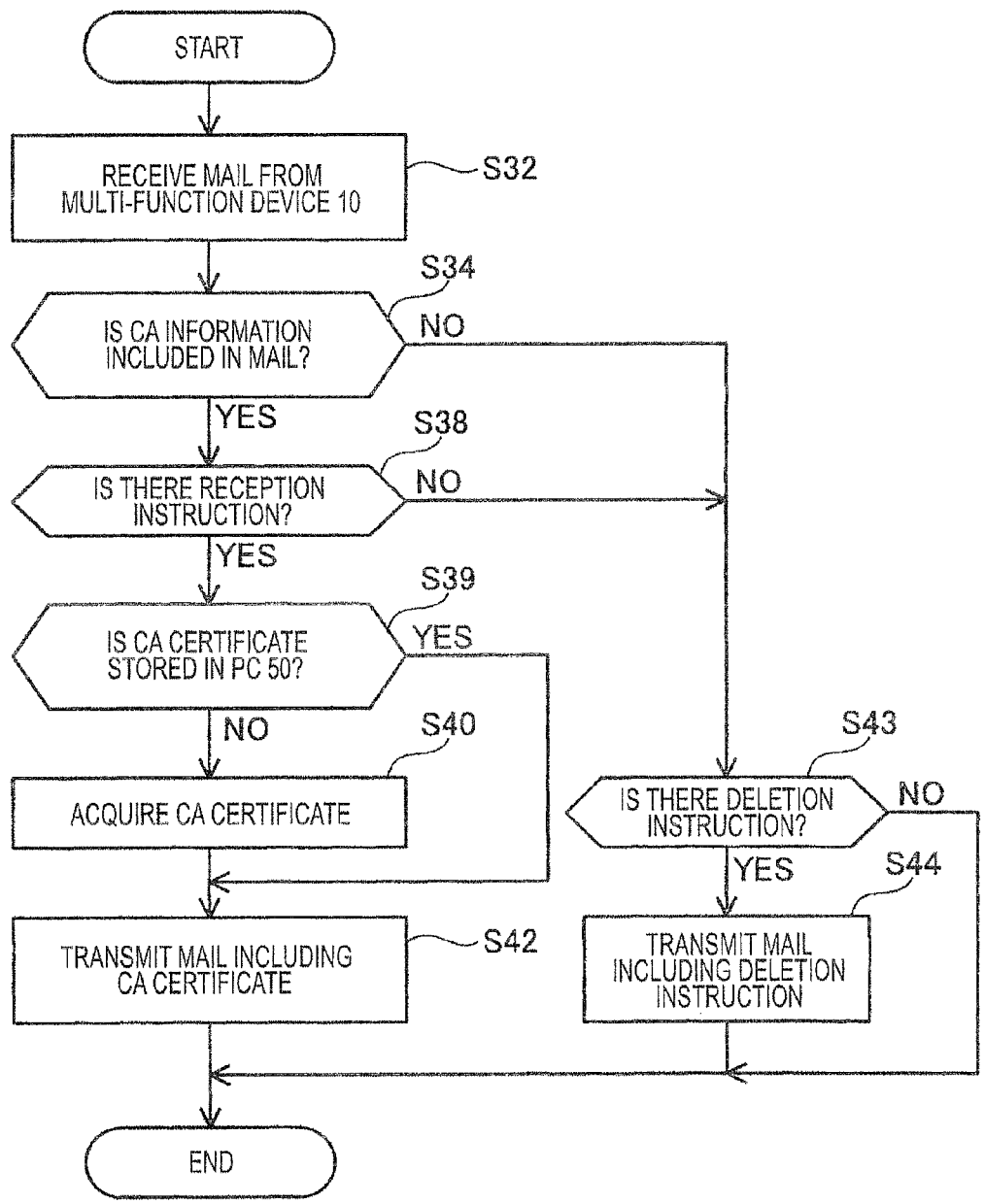
FIG. 7 shows a flowchart of a process executed by a PC.

Subsequently, a process to be executed by a control unit of the PC 50 of the manager will be described. FIG. 7 shows a flowchart of a process to be executed by the control unit of the PC 50. This process is started at every predetermined timing. When an electronic mail, a transmission source of which is the multi-function device 10, exists among electronic mails received from the POP3 server 8, the control unit executes the process of S32. In S32, the control unit receives the electronic mail, the transmission source of which is the multi-function device 10, from the POP3 server 8. At this time, when a plurality of electronic mails has been received, the process of S34 and subsequent steps is executed for all the electronic mails. Next, the control unit of the PC 50 determines whether or not CA information is included in the received electronic mail, that is, whether or not the received electronic mail is the second electronic mail transmitted from the multi-function device 10 in S19 of FIG. 5 (S34). If YES in S34, the control unit executes the process of S38. If NO in S34, the control unit executes the process of S43.

Here, upon receipt of the electronic mail including the CA information, the manager can determine whether or not a specific CA is a reliable CA by viewing a specific CA name included in the CA information. The manager can determine whether or not the first electronic mail is to be received as a reliable electronic mail from information of the received first electronic mail (that is, the mail address of the transmission source of the first electronic mail, the title and the text of the first electronic mail, or the like). That is, the manager can determine whether to store the specific CA certificate in the multi-function device 10 from the first electronic mail. When the manager determines that the first electronic mail is to be received as the reliable electronic mail, the manager can input a receiving instruction, which instructs the multi-function device 10 to receive and output the first electronic mail, to the PC 50.

In S38, the control unit of the PC 50 determines whether or not the above-described receiving instruction has been input. Here, if YES, the control unit of the PC 50 determines whether or not the specific CA certificate is stored in the PC 50 (S39). If NO in S39, the control unit of the PC 50 downloads the specific CA certificate (S40). Specifically, for example, the control unit 12 of the PC 50 accesses a specific CA site on the Internet 4 and downloads the specific CA certificate. When the specific CA certificate is acquired, the control unit of the PC 50 executes the process of S42. If YES in S39, the process proceeds to S42 by skipping S40. In S42, the control unit of the PC 50 transmits an electronic mail including the specific CA certificate to the mail address of the multi-function device 10. When S42 is ended, the control unit of the PC 50 ends the process.

On the other hand, when an electronic mail is received without CA information, the manager can determine whether or not to delete the first electronic mail. Here, the mail which does not include the CA information includes an electronic mail including information indicating that the verification of the CA certificate has failed, an electronic mail including information indicating that the verification of the encrypted text digest has failed, and an electronic mail including information indicating that the verification of the term of validity of the device certificate has failed. When the manager has determined to delete the first electronic mail, a deletion instruction for deleting the first electronic mail can be input to the PC 50. When the manager determines not to instruct the multi-function device 10 to receive the first electronic mail even though the electronic mail including the CA information has been received, the deletion instruction for deleting the first electronic mail can be input to the PC 50 without inputting the above-described receiving instruction to the PC 50. For example, in terms of the receiving instruction and the deletion instruction, the case of designating each instruction for the text of the electronic mail received from the multi-function device 10, the case of providing a selection option capable of transmitting a reply mail to the multi-function device 10, or the like is included. In this case, an instruction of selected content is input to the PC 50 by allowing the manager to select one of the selection options included in the electronic mail text. The electronic mail shown in S42 and S44 can be transmitted to the multi-function device 10.

In S43, the control unit of the PC 50 determines whether or not the above-described deletion instruction has been input. Here, if YES in S43, the control unit of the PC 50 transmits an electronic mail including the deletion instruction indicating that the first electronic mail is to be deleted to the mail address of the multi-function device 10 (S44). This deletion instruction includes the mail ID of the first electronic mail to be deleted. When S42 is ended, the control unit of the PC 50 ends the process. If NO in S43, the PC 50 ends the process.

The multi-function device system 2 according to the exemplary embodiment has been described in detail. When a specific CA certificate is not stored in the certificate table 30, the multi-function device 10 according to the exemplary embodiment can notify the manager of specific CA information. The manager acquiring the specific CA information can determine whether or not to store a specific CA certificate in the multi-function device 10 using the specific CA information. When the manager has determined to store the specific CA certificate in the multi-function device 10, the manager can transmit an electronic mail to which the specific CA certificate has been attached to the mail address of the multi-function device 10. The multi-function device 10 can acquire the specific CA certificate by receiving the electronic mail transmitted from the manager and can store the acquired specific CA certificate in the certificate table 30. As a result, when the first electronic mail has been re-received from the POPS server 8, an electronic signature attached to the re-received first electronic mail can be verified and the electronic mail for which the verification of the electronic signature has succeeded can be printed using the specific CA certificate stored in the certificate table 30. Thus, reliable printed matters can be provided to the user of the multi-function device 10 even when the specific CA certificate is not stored in the certificate table 30.

When the electronic mail including the specific CA information is transmitted to the manager, the multi-function device 10 can provide the manager with the first electronic mail itself along with the above-described electronic mail. Thus, information for determining whether or not the manager is to store the specific CA certificate in the multi-function device 10 as well as the specific CA information can be provided to the manager.

The multi-function device 10 deletes a received mail, which is an electronic mail having an attached electronic signature and is not handled as a reliable electronic mail, from the storage area of the multi-function device 10, and then re-receives the electronic mail when accessing the POP3 server 8. Thus, the storage area to be used by the multi-function device 10 can be prevented from being occupied by the received mail.

As the electronic mail including the specific CA information is transmitted to the manager, the manager only transmits a reply to the electronic mail, so that the multi-function device 10 can simply store a necessary CA certificate in the multi-function device 10. By using an electronic mail even for the manager, the multi-function device 10 can collectively process an electronic mail to which an electronic signature is attached and an electronic mail from the manager. At this time, an appropriate process can be executed even for an electronic mail to which an electronic signature is attached at the same timing as that of the electronic mail from the manager by first processing an electronic mail from the manager prior to an electronic mail to which an electronic signature is attached among received electronic mails.

The exemplary embodiment of the invention has been described above in detail, but the exemplary embodiment is only illustrative and the claims are not limited thereby. The art described in the claims includes various modifications and changes of the concrete examples described as follows.

The control unit 12 of the multi-function device 10 may allow the user to input an instruction of whether or not a specific CA certificate is to be acquired via an operation unit 16 provided in the multi-function device 10 under condition that the specific CA certificate is not stored in the certificate table 30. For example, the control unit 12 may acquire the specific CA certificate from the Internet 4 and store the specific CA certificate in the certificate table 30 under condition that an instruction indicating that the specific CA certificate is to be acquired has been input from the user.

In the above-described exemplary embodiment, in the multi-function device 10, until the receiving instruction or the deletion instruction for the first electronic mail is received from the manager even when an electronic mail including CA information regarding the first electronic mail or a verification failure notification has been previously transmitted to the manager, the electronic mail including the notification is re-transmitted to the manager. For example, when the electronic mail including the CA information regarding the first electronic mail or the verification failure notification has been transmitted to the manager, information reported to the manager in correspondence with the first electronic mail is stored. When the verification of the electronic signature has been unsuccessful by the same reason, the notification may not be transmitted to the manager. This configuration can prevent the electronic mail of the same content from being repeatedly transmitted.

The above-described technical elements or the drawings exert technical utility singly or by various combinations, and are not limited to combinations described in the claims at the time of the application. Also, the above-described art can simultaneously achieve plural purposes, and the achievement itself of one of the purposes has technical utility.

What is claimed is:

1. A communication apparatus configured to operate as a terminal configured to receive electronic mail from a mail server via a network, the communication apparatus comprising:
a receiving unit that is configured to receive the electronic mail from the mail server;
a first storage unit that is configured to store a certification authority certificate;
a second storage unit that is configured to store an electronic mail address corresponding to the user;
a verification unit that is configured to verify an electronic signature attached to a first electronic mail received by the receiving unit based on the certification authority certificate stored in the first storage unit;
an output unit that is configured to output the first electronic mail when a verification result of the verification unit is positive;
a deletion unit that is configured to delete the first electronic mail from the mail server when the first electronic mail is configured to be output by the output unit;
a notification unit that is configured to notify a user of information regarding a specific certification authority when a specific certification authority certificate is not stored in the first storage unit, wherein the specific certification authority certificate is issued by the specific certification authority that authenticates the electronic signature attached to the first electronic mail received by the receiving unit, wherein the notification unit executes the notification by transmitting a second electronic mail including the information regarding the specific certification authority to the electronic mail address corresponding to the user stored in the second storage unit;
an acquiring unit that is configured to acquire the specific certification authority certificate in accordance with an operation by the user, wherein when the receiving unit receives a third electronic mail, a transmission source of which is the electronic mail address corresponding to the user, and when the specific certification authority is included in the third electronic mail, the acquiring unit acquires the specific certification authority certificate included in the third electronic mail; and
a storage control unit that is configured to store the specific certification authority certificate acquired by the acquiring unit in the first storage unit,
wherein the receiving unit again receives the first electronic mail from the mail server when the mail server stores the first electronic mail,
wherein the verification unit verifies an electronic signature attached to the again received first electronic mail based on the certification authority certificate stored in the first storage unit, and
wherein when electronic mails which the receiving unit receives at one time include both of the first electronic mail and the third electronic mail, the specific certification authority certificate included in the third electronic mail is first stored in the first storage unit before the electronic signature attached to the first electronic mail is verified.

2. The communication apparatus according to claim 1, wherein when the specific certification authority certificate is not included in the third electronic mail, the deletion unit deletes the first electronic mail from the mail server.

3. The communication apparatus according to claim 2, wherein when the specific certification authority certificate is not included in the third electronic mail and an instruction of deletion of the first electronic mail is included in the third electronic mail, the deletion unit deletes the first electronic mail from the mail server.

4. The communication apparatus according to claim 1, wherein the notification unit notifies the user of the information regarding the specific certification authority and information regarding the first electronic mail.

5. The communication apparatus according to claim 1, wherein the receiving unit is configured to periodically check the mail server for the electronic mail destined for the communication apparatus and receive the electronic mail from the mail server in accordance with a checking result of the electronic mail,
wherein the receiving unit repeatedly receives the first electronic mail from the mail server unless the deletion unit deletes the first electronic mail, and
wherein when the certification authority certificate acquired by the acquiring unit is stored in the first storage unit, the verification unit verifies the electronic signature attached to the again received first electronic mail based on the certification authority certificate stored in the first storage unit.

* * * * *